US012688196B1

(12) United States Patent
Bhonsle et al.

(10) Patent No.: US 12,688,196 B1
(45) Date of Patent: Jul. 21, 2026

(54) CONSOLIDATED LOGGING AND AUDITING FOR GENERATIVE AI FEEDBACK DATA IN A DATABASE SYSTEM

(71) Applicant: Salesforce, Inc., San Francisco, CA (US)

(72) Inventors: Makarand Vishwas Bhonsle, Mountain View, CA (US); Prithvi Krishnan Padmanabhan, San Ramon, CA (US); Atul Chandrakant Kshirsagar, San Ramon, CA (US); Na Cheng, Bellevue, WA (US); Monojit Banerjee, Claymont, DE (US); Qingyu Lin, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/088,108

(22) Filed: Mar. 24, 2025

(51) Int. Cl.
| | |
|---|---|
| *G06F 16/25* | (2019.01) |
| *G06F 16/22* | (2019.01) |
| *G06F 16/29* | (2019.01) |

(52) U.S. Cl.
CPC ............ *G06F 16/254* (2019.01); *G06F 16/22* (2019.01); *G06F 16/29* (2019.01)

(58) Field of Classification Search
CPC ......... G06F 16/254; G06F 16/22; G06F 16/29
See application file for complete search history.

(56) References Cited

U.S. PATENT DOCUMENTS

| | | | |
|---|---|---|---|
| 10,585,657 B2 | 3/2020 | Padmanabhan | |
| 10,853,577 B2 | 12/2020 | Alexander et al. | |

| | | | |
|---|---|---|---|
| 11,038,771 B2 | 6/2021 | Padmanabhan | |
| 11,082,226 B2 | 8/2021 | Hildebrand et al. | |
| 11,128,465 B2 | 9/2021 | Hildebrand et al. | |
| 11,144,335 B2 | 10/2021 | Padmanabhan et al. | |
| 11,157,484 B2 | 10/2021 | Padmanabhan et al. | |
| 11,244,313 B2 | 2/2022 | Padmanabhan et al. | |
| 11,288,280 B2 | 3/2022 | Padmanabhan et al. | |
| 11,314,790 B2 | 4/2022 | Chang et al. | |
| 11,372,635 B2 | 6/2022 | Padmanabhan et al. | |
| 11,379,671 B2 | 7/2022 | Alexander et al. | |
| 11,392,828 B2 | 7/2022 | Velasco et al. | |
| 11,431,486 B2 | 8/2022 | Padmanabhan | |
| 11,431,693 B2 | 8/2022 | Padmanabhan | |
| 11,468,406 B2 | 10/2022 | Padmanabhan | |

(Continued)

FOREIGN PATENT DOCUMENTS

| | | |
|---|---|---|
| AU | 2019345039 A1 | 4/2021 |
| AU | 2019345040 A1 | 4/2021 |

(Continued)

*Primary Examiner* — Courtney Harmon

(74) *Attorney, Agent, or Firm* — Polygon IP, LLP

(57) ABSTRACT

A system may include a generative language model platform facilitating generation of novel text via a generative language model. The system may include a communication gateway communicating with client systems located outside of the computing services environment and within a first geographic region. The system may include a feedback service configured to write generative language model logging input data to a storage location within the geographic region. The system may include a data service instance configured to store database records determined based on generative language model logging input data retrieved from the storage location.

17 Claims, 8 Drawing Sheets

(56) References Cited

U.S. PATENT DOCUMENTS

| | | |
|---|---|---|
| 11,469,886 B2 | 10/2022 | Padmanabhan |
| 11,488,176 B2 | 11/2022 | Padmanabhan et al. |
| 11,568,437 B2 | 1/2023 | Padmanabhan |
| 11,580,179 B2 | 2/2023 | Xiu et al. |
| 11,588,803 B2 | 2/2023 | Padmanabhan et al. |
| 11,611,560 B2 | 3/2023 | Padmanabhan |
| 11,636,098 B2 | 4/2023 | Padmanabhan |
| 11,770,445 B2 | 9/2023 | Padmanabhan |
| 11,783,024 B2 | 10/2023 | Padmanabhan |
| 11,803,537 B2 | 10/2023 | Padmanabhan |
| 11,810,031 B2 | 11/2023 | Dhaliwal et al. |
| 11,893,002 B2 | 2/2024 | Padmanabhan |
| D1,023,041 S | 4/2024 | Dhaliwal et al. |
| D1,024,089 S | 4/2024 | Dhaliwal et al. |
| 11,954,183 B2 | 4/2024 | Padmanabhan et al. |
| 12,001,801 B2 | 6/2024 | Wang et al. |
| 12,111,827 B2 | 10/2024 | Kshirsagar et al. |
| 12,332,878 B1 * | 6/2025 | Shimshock ....... G06F 16/24535 |
| 2019/0236559 A1 | 8/2019 | Padmanabhan |
| 2019/0236562 A1 | 8/2019 | Padmanabhan |
| 2019/0236598 A1 | 8/2019 | Padmanabhan |
| 2019/0236606 A1 | 8/2019 | Padmanabhan et al. |
| 2019/0238316 A1 | 8/2019 | Padmanabhan |
| 2019/0303445 A1 | 10/2019 | Padmanabhan |
| 2019/0377806 A1 | 12/2019 | Padmanabhan et al. |
| 2020/0042939 A1 | 2/2020 | Padmanabhan |
| 2020/0089672 A1 | 3/2020 | Velisetti et al. |
| 2020/0134656 A1 | 4/2020 | Padmanabhan |
| 2020/0250174 A1 | 8/2020 | Padmanabhan et al. |
| 2020/0250176 A1 | 8/2020 | Padmanabhan |
| 2020/0250177 A1 | 8/2020 | Padmanabhan |
| 2020/0250295 A1 | 8/2020 | Padmanabhan |
| 2020/0250683 A1 | 8/2020 | Padmanabhan et al. |
| 2020/0250747 A1 | 8/2020 | Padmanabhan |
| 2020/0252205 A1 | 8/2020 | Padmanabhan |
| 2020/0252404 A1 | 8/2020 | Padmanabhan |
| 2020/0252406 A1 | 8/2020 | Padmanabhan et al. |
| 2020/0349142 A1 | 11/2020 | Padmanabhan |
| 2020/0349564 A1 | 11/2020 | Padmanabhan et al. |
| 2020/0371995 A1 | 11/2020 | Padmanabhan |
| 2021/0149921 A1 | 5/2021 | Alexander et al. |
| 2021/0149949 A1 | 5/2021 | Alexander et al. |
| 2021/0150610 A1 | 5/2021 | Mao et al. |
| 2021/0152536 A1 | 5/2021 | Padmanabhan et al. |
| 2021/0182423 A1 | 6/2021 | Padmanabhan |
| 2021/0182773 A1 | 6/2021 | Padmanabhan |
| 2021/0226774 A1 | 7/2021 | Padmanabhan |
| 2021/0240498 A1 | 8/2021 | Padmanabhan et al. |
| 2021/0243193 A1 | 8/2021 | Padmanabhan |
| 2021/0342329 A1 | 11/2021 | Padmanabhan |
| 2021/0373878 A1 | 12/2021 | Padmanabhan et al. |
| 2021/0374759 A1 | 12/2021 | Padmanabhan et al. |
| 2021/0397604 A1 | 12/2021 | Padmanabhan |
| 2022/0006705 A1 | 1/2022 | Padmanabhan |
| 2022/0027356 A1 | 1/2022 | Padmanabhan et al. |
| 2022/0114238 A1 | 4/2022 | Padmanabhan et al. |
| 2022/0245560 A1 | 8/2022 | Dhaliwal et al. |
| 2022/0248165 A1 | 8/2022 | Dhaliwal et al. |
| 2022/0293094 A1 | 9/2022 | Mao et al. |
| 2022/0318669 A1 | 10/2022 | Alexander et al. |
| 2022/0358462 A1 | 11/2022 | Oldfield et al. |
| 2023/0038714 A1 | 2/2023 | Padmanabhan et al. |
| 2023/0080808 A1 | 3/2023 | Padmanabhan |
| 2023/0080927 A1 | 3/2023 | Padmanabhan |
| 2023/0085481 A1 | 3/2023 | Padmanabhan |
| 2023/0086302 A1 | 3/2023 | Bhagavath et al. |
| 2023/0089596 A1 | 3/2023 | Huffman et al. |
| 2023/0237190 A1 | 7/2023 | Padmanabhan |
| 2023/0237499 A1 | 7/2023 | Padmanabhan |
| 2023/0245038 A1 | 8/2023 | Padmanabhan |
| 2023/0247019 A1 | 8/2023 | Kshirsagar et al. |
| 2023/0342734 A1 | 10/2023 | Padmanabhan |
| 2023/0367766 A1 | 11/2023 | Padmanabhan et al. |
| 2023/0367776 A1 | 11/2023 | Padmanabhan et al. |
| 2023/0368185 A1 | 11/2023 | Padmanabhan et al. |
| 2023/0368191 A1 | 11/2023 | Padmanabhan et al. |
| 2023/0368291 A1 | 11/2023 | Padmanabhan et al. |
| 2023/0394481 A1 | 12/2023 | Padmanabhan |
| 2023/0396445 A1 | 12/2023 | Padmanabhan |
| 2024/0037503 A1 | 2/2024 | Padmanabhan |
| 2024/0062010 A1 | 2/2024 | Kale et al. |
| 2024/0095220 A1 | 3/2024 | Isaacs et al. |
| 2024/0177143 A1 | 5/2024 | Brandeleer et al. |
| 2024/0220466 A1 | 7/2024 | Barak et al. |
| 2024/0242022 A1 | 7/2024 | Yee et al. |
| 2024/0256581 A1 | 8/2024 | Jiang et al. |
| 2024/0296443 A1 | 9/2024 | Padmanabhan |
| 2024/0303443 A1 | 9/2024 | Cheng et al. |
| 2024/0303473 A1 | 9/2024 | Cheng et al. |
| 2024/0378424 A1 * | 11/2024 | Bodigutla ............ G06N 3/0455 |
| 2024/0412059 A1 | 12/2024 | Radhakrishnan et al. |
| 2024/0419830 A1 * | 12/2024 | Park ................... G06F 21/6254 |
| 2024/0427764 A1 | 12/2024 | Kshirsagar et al. |
| 2025/0005299 A1 * | 1/2025 | Padmanabhan ....... G06F 16/335 |
| 2025/0190617 A1 * | 6/2025 | Watson .............. G06F 21/6245 |
| 2025/0321719 A1 * | 10/2025 | Hoban ..................... G06F 8/34 |

FOREIGN PATENT DOCUMENTS

| | | | |
|---|---|---|---|
| AU | 2023214371 A1 | 8/2023 | |
| AU | 2023216803 A1 | 9/2023 | |
| CN | 111919417 A | 11/2020 | |
| CN | 113039568 A | 6/2021 | |
| CN | 113056760 A | 6/2021 | |
| CN | 113168622 B | 7/2021 | |
| CN | 114175037 A | 3/2022 | |
| CN | 114365133 A | 4/2022 | |
| CN | 114817284 A | 7/2022 | |
| EP | 3747153 A1 | 12/2020 | |
| EP | 3776255 A1 | 2/2021 | |
| EP | 3853792 A1 | 7/2021 | |
| EP | 3853793 A1 | 7/2021 | |
| EP | 3853794 A1 | 7/2021 | |
| EP | 3973431 A1 | 3/2022 | |
| EP | 4007985 A1 | 6/2022 | |
| JP | 2021512416 A | 5/2021 | |
| JP | 7147054 B2 | 10/2022 | |
| JP | 2023029895 A | 3/2023 | |
| JP | 7268140 B2 | 5/2023 | |
| JP | 7341225 B2 | 9/2023 | |
| JP | 7434557 B2 | 2/2024 | |
| JP | 7451565 B2 | 3/2024 | |
| WO | 2024254197 A1 | 12/2024 | |

* cited by examiner

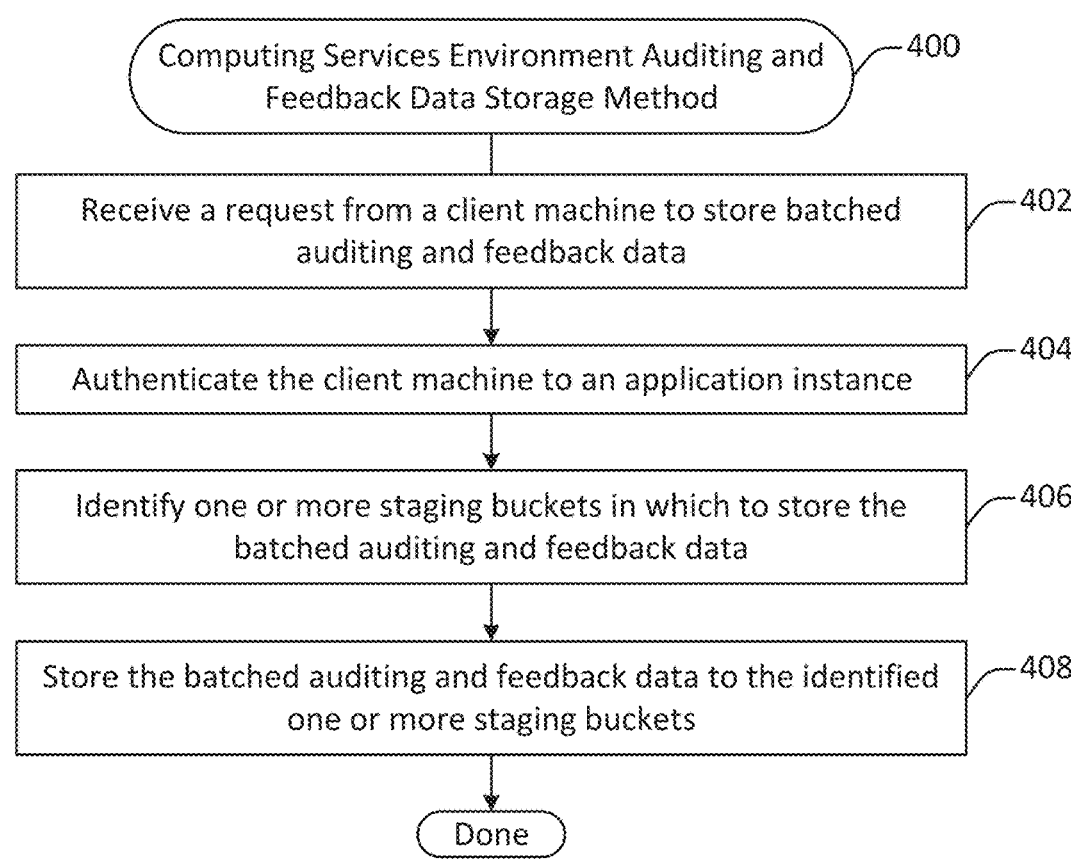

Computing Services Environment Auditing and Feedback Data Storage Method ——400

Receive a request from a client machine to store batched auditing and feedback data ——402

Authenticate the client machine to an application instance ——404

Identify one or more staging buckets in which to store the batched auditing and feedback data ——406

Store the batched auditing and feedback data to the identified one or more staging buckets ——408

Done

Figure 4

CONSOLIDATED LOGGING AND AUDITING FOR GENERATIVE AI FEEDBACK DATA IN A DATABASE SYSTEM

FIELD OF TECHNOLOGY

This patent application relates generally to database systems, and more specifically to database systems configured to provide access to artificial intelligence agents.

BACKGROUND

"Cloud computing" services provide shared resources, applications, and information to computers and other devices upon request. In cloud computing environments, services can be provided via a computing services environment by one or more servers accessible over the Internet rather than installing software locally on in-house computer systems. Users can interact with cloud computing services to undertake a wide range of tasks.

More recently, generative language models have been developed that allow the generation of novel text. However, systems for managing interactions between cloud computing environments and generative language models are limited. Accordingly, improved systems and methods are needed in order to incorporate generative language models into the cloud-based infrastructure commonly employed for accessing computing services.

BRIEF DESCRIPTION OF THE DRAWINGS

The included drawings are for illustrative purposes and serve only to provide examples of possible structures and operations for the disclosed inventive systems, apparatus, methods, and computer program products for consolidated logging and auditing for generative AI feedback data in a database system. These drawings in no way limit any changes in form and detail that may be made by one skilled in the art without departing from the spirit and scope of the disclosed implementations.

FIG. 4 illustrates a computing services environment auditing and feedback data storage method, performed in accordance with one or more embodiments.

DETAILED DESCRIPTION

Introduction

Figure 1:
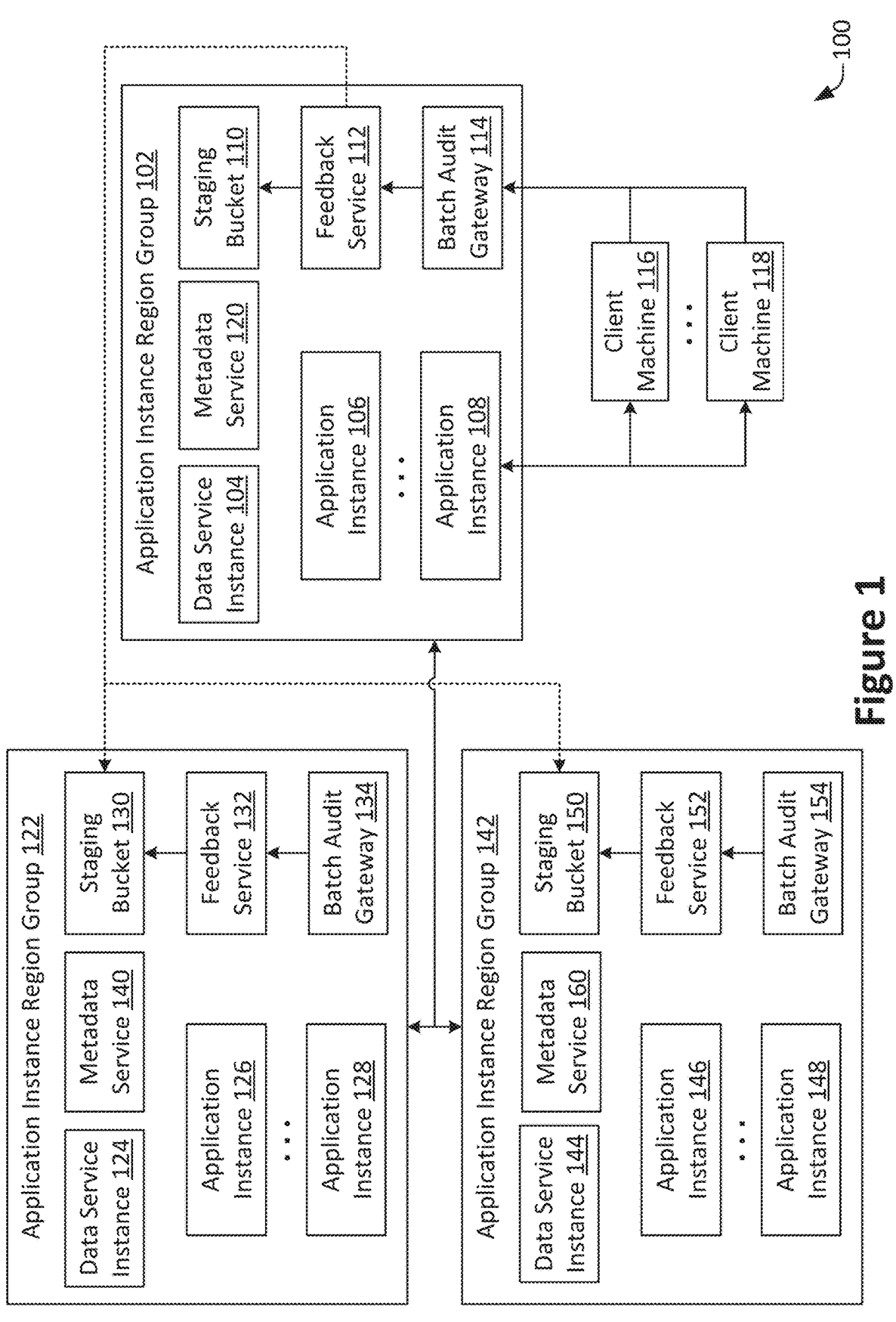
FIG. 1 illustrates a computing services environment, configured in accordance with one or more embodiments.

Computing services environments provide a variety of services to client machines via the Internet. Such computing services environments capture logging data characterizing client-server interactions. As the generative artificial intelligence (AI) landscape broadens, however, there are emerging ecosystems where generations happen either offline (e.g., via on-device large language models (LLMS)) or in a batch mode within an LLM provider infrastructure. In such scenarios, the audit and feedback data is not captured in real time at a per generation or feedback level, for instance since the text generation does not flow directly through the computing services environment. Compounding the difficulty is the fact such data may be generated all over the world and conventionally collected either not at all or in a region-specific manner, whereas analysis would be facilitated by centralized storage.

Consider the example of a generative AI application for generating sales emails. The primary user of such an application would be a sales agent who uses the application to generate emails for their customers. For instance, the application may include a prompt with instructions to a generative language model such as "Generate a sales pitch email for John Doe from Jane at Fit Shoes Inc. pitching the new sports shoe line launched this year," resulting in email text generated by an LLM.

Upon receiving such a request in the form of an input prompt, the chosen LLM, and other request parameters, the computing services environment may strip any personally identifiable information (PII) from the input prompt (with a certain confidence score and probability of error), and then send the prompt to the chosen LLM. Upon receiving the response from the LLM, the platform may then calculate a safety score for the response across various safety categories, add back the stripped PII to the response, and send back the response to the user (e.g., the sales agent).

Upon receiving the response, the sales agent may review the response and choose to accept it as-is, edit the response, or choose to regenerate the response. These user actions may be collected as implicit feedback by the system. Upon receiving an acceptable response, the sales agent may choose to provide explicit feedback with any additional notes and/or details to the system about the specific generation.

Such an interaction includes various information that is useful to capture for purposes such as auditing, prompt engineering, model tuning, and the like. For instance, such an interaction includes elements such as the initial request, the prompt template associated with the application, the hydrated prompt that is filled with data and provided to the LLM, the prompt completion that is generated by the LLM, and any explicit or implicit feedback. Using conventional techniques, collecting such information may be difficult or impossible. For example, the LLM may be located at the client machine or otherwise outside of the computing services environment, meaning that the prompt completion does not flow through the computing services environment as it passes from the LLM to the client application. As another example, the explicit or implicit feedback may be generated at the client machine rather than the computing services environment.

Various embodiments described herein describe a computing services environment and associated methodology in which text generation requests, responses, and/or feedback elements are captured in batches and then seamlessly integrated into existing audit and feedback data models. In some embodiments, logging data from disparate sources may be collected and aggregated from disparate sources into one or more instances of an application as specified based on configuration information. A gateway may then receive generative AI data logging requests from edge devices. The gateway then identifies a logging data location for the generative AI logging data by consulting a feedback service. The generative AI logging data is then forwarded to the logging service for the appropriate region. At the logging service, the data is processed into a set of tables using a JSON transform. The data may then be accessed for analytics purposes.

According to various embodiments, techniques and mechanisms described herein support the configuration of one or more end points for receiving and aggregating generative AI auditing and feedback data. For example, a tenant of a computing services environment may be associated with multiple application instances that reside in different geographic regions. These multiple application instances may provide communication with potentially many millions of client machines located potentially all over the world. These different client machines may then generate novel text via locally-accessed LLMs. Various embodiments described herein allow the tenant to designate one or more application instances as a home instance at which to aggregate auditing and feedback data generated at those client machines. The batched auditing and feedback data is first received from client machines at LLM gateways associated with application instance region groups that each include some number of application instances. The LLM gateways then coordinate with local feedback services and metadata services to identify a destination for the batched auditing and feedback data and then store that data in the appropriate storage bucket. After the data is stored, the centralized data service instance for the tenant can process and ingest the data so that it is accessible in a centralized repository for operations such as auditing, analysis, prompt engineering, and model tuning.

According to various embodiments, techniques and mechanisms described herein provide for securely collecting batched generative audit data from generative AI features across a computing services environment, even when such data is generated at edge devices such as handheld smart devices (e.g., phones, tablets, etc.) or other computing devices and does not otherwise directly pass through the computing services environment. Such edge devices may be located in various geographic locations and may communicate with various application instances. Nevertheless, data generated at such edge devices may be collected and aggregated into one or more centralized data storage repositories. Techniques and mechanisms described herein also provide for securely auditing batched generative audit data from generative AI features collected from across the computing services environment. Techniques and mechanisms described herein also provide for asynchronously and securely collecting batched generative feedback from edge devices and other sources of generative AI data. Batched audit and feedback data may be seamlessly integrated into existing generative AI audit and feedback data models. Such approaches may provide benefits such as enhanced security, reduced network usage, reduced computing load, reduced device computing resource utilization, and/or other advantages.

System Architecture

FIG. 1 illustrates a computing services environment 100, configured in accordance with one or more embodiments. The computing services environment 100 is configured to provide computing services to various client machines via the internet. The computing services environment 100 provides computing services via a set of application instances, such as the application instances 106 through 108, 126 through 128, and 146 through 148. The application instances shown in FIG. 1 are divided into different application instance region groups, such as the application instance region groups 102, 122, and 142. An application region instance group includes a batch audit gateway (114, 134, 154), a feedback service (112, 132, 152), a staging bucket (110, 130, 150), a metadata service (120, 140, 160) and a data service instance (104, 124, 144).

In some embodiments, an application instance may correspond to an organization such as a company. A single organization may be associated with multiple application instances. For an organization, these different application instances may be associated with, for example, different geographic regions and/or other logical divisions.

According to various embodiments, different computing services environments may have different numbers of application instance region groups. For instance, an application instance region group may correspond to a continent (e.g., Africa), a country (e.g., China), a portion of a country (e.g., U.S. East), an area of the world (e.g., Asia Pacific), or some other division.

In some embodiments, an application instance region group may correspond to a different logical division instead of, or in addition to, a geographic division. For instance, an application instance region group may be used to group application instances by one or more characteristics such as computing resources, requests, size, volume, or any other suitable characteristic.

In some embodiments, client machines 116 through 118 may communication with one or more application instances such as the application instance 108. The client machines 116 through 118 may access various computing services provided by the computing services environment through the application instance 108.

According to various embodiments, the client machines 116 through 118 may be any suitable computing device. For example, a client machine may be a laptop computer, a desktop computer, a mobile phone, a tablet computer, or any other type of computing device.

In some embodiments, a client machine may be configured to generate data via an LLM. The LLM may be located at the client device or may be located elsewhere and accessed via the client device. For instance, the client machine may, in the course of accessing computing services via the computing services environment 100, access an LLM interface at the client machine to generate novel text via an LLM. The LLM may be locally hosted at the client machine. Alternatively, the LLM may be hosted outside the client machine and accessed via a network interface.

In some embodiments, the batch audit gateway 114 may receive audit and feedback data from the client machines 116 through 118. Such data may be transmitted to the gateway from a client machine via a secure connection. In some instances such data may be transmitted in real time or near real time, shortly after it is generated. Alternatively, such data may be batched and transmitted periodically, for instance at scheduled intervals and/or when a suitable amount of data has been aggregated.

In some embodiments, the batch audit gateway may transmit audit and feedback data to the feedback service 112. The feedback service may consult the metadata service 120 to identify one or more appropriate staging buckets for storing the audit data. The metadata service 120 may communicate with other elements of the computing services environment to maintain configuration information for a tenant associated with multiple application instances. For instance, the tenant may designated an application instance as a "home" instance. Then, auditing and feedback data received at other application instances may be forwarded to the home instance for storage and analysis.

Once the appropriate staging bucket or buckets are identified, the feedback service transmits the data to the staging bucket. Additional details for receiving and storing audit data in a staging bucket are discussed throughout the application, for instance with respect to the methods 300 and 400 shown in FIG. 3 and FIG. 4.

In some embodiments, the staging bucket 110 may be implemented as a simple storage service (S3) bucket). The data service 104 may read the data from the staging bucket 110 to ingest it. As part of this ingestion process, the data service 104 may apply a data transform to integrate the newly ingested data with existing audit data in that data service instance. Additional details for ingesting data from a staging bucket are discussed throughout the application as filed, for instance with respect to the architecture diagram 200 shown in FIG. 2 and the method 500 shown in FIG. 6.

Figure 2:
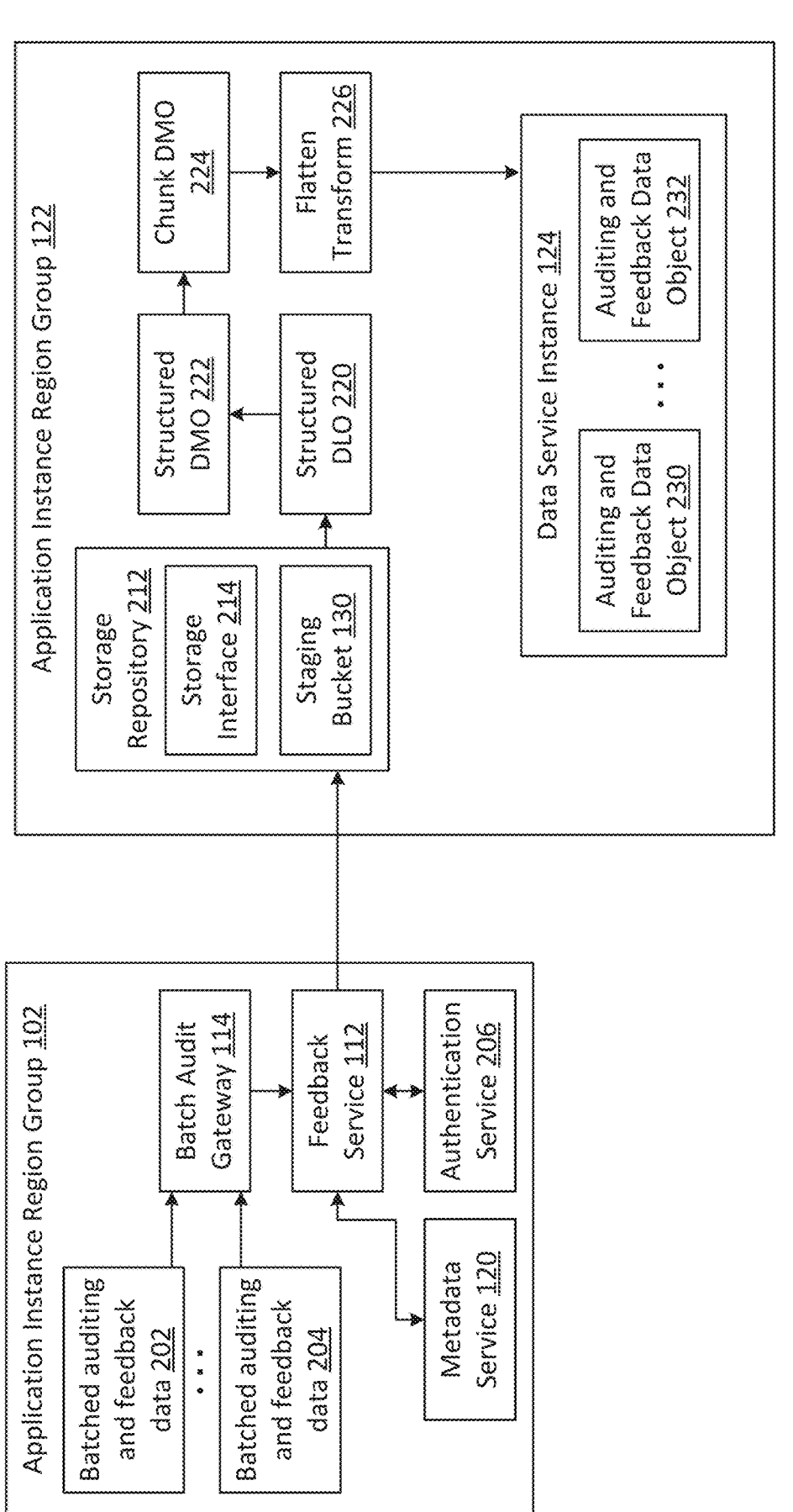
FIG. 2 illustrates an additional view of the computing services environment, configured in accordance with one or more embodiments.

FIG. 2 illustrates an additional view of the computing services environment 100, configured in accordance with one or more embodiments. In FIG. 2, batched auditing and feedback data 202 through 204 is provided to the batch audit gateway 114 within the application instance region group 102. The batched auditing and feedback data 202 through 204 may be provided from client machines in a manner discussed in additional detail with respect to the method 400 shown in FIG. 4. The bath audit gateway 114 may invoke the feedback service 112, and the client machines may authenticate to the feedback service 112 via the authentication service 206.

In some embodiments, the batched auditing and feedback data may adhere to one or more predetermined formats. For instance, an instance of the batched auditing and feedback data may be implemented as a multi-line JSON file.

Figure 5:
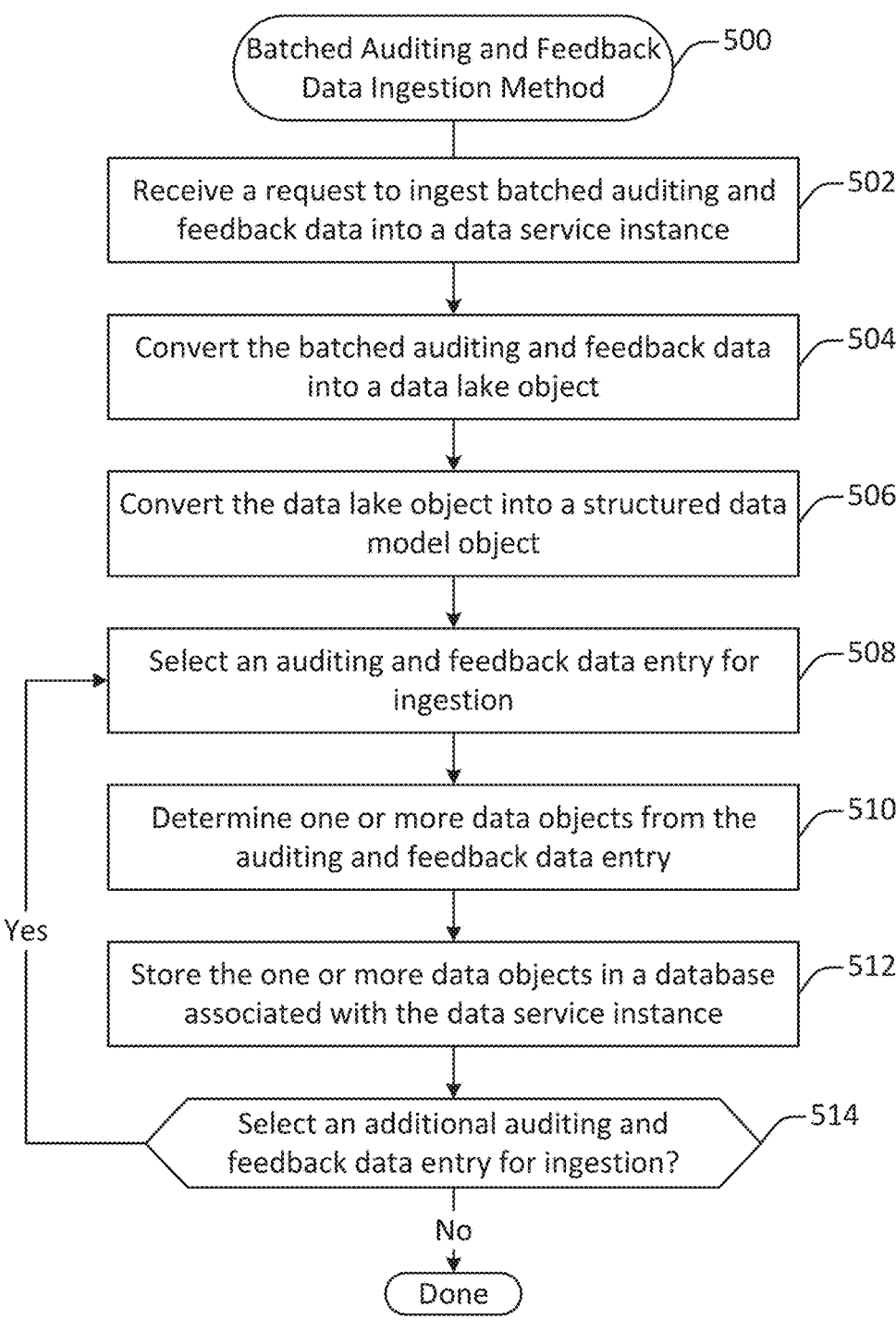
FIG. 5 illustrates a batched auditing and feedback data ingestion method, performed in accordance with one or more embodiments.

As discussed herein, for instance with respect to the method 500 shown in FIG. 5, the feedback service may identify one or more staging buckets to which to store the batched auditing and feedback data. For instance, the feedback service may consult the metadata service 120 to identify the appropriate staging bucket or buckets. For the purpose of illustration, in FIG. 2 the staging bucket 130, located in a different application instance region group, has been selected as the destination. However, other staging buckets, such as the staging bucket 110 and/or the staging bucket 150, may be alternatively or additionally selected.

Upon determining to store batched auditing and feedback data 202 to the staging bucket 130, the feedback service communicates with the storage repository 212 to transfer the data. Transferring the data may involve communicate with the storage interface 214, which may act as a storage layer on top of the staging bucket 130 in which the data is actually stored. For instance, the storage interface 214 may perform operations such as identifying a location at which to store the data, recording one or more metadata elements associated with the data, providing an interface through which to access the data, and/or other such storage-related operations.

Once the batched auditing and feedback data 202 is stored in the staging bucket 130, the data may pass through a pipeline for ingestion into the data service instance 124. For example, the batched auditing and feedback data 202 may be first converted to one or more structured data lake objects (DLOs) at 220. The DLO may serve as a container for data brought into the data service.

According to various embodiments, a DLO may be converted to a structured data model object (DMO) at 222 and a chunk data model object (DMO) at 224. The data model objects may provide a harmonized representation of the data structured in a consistent way. In the DMO, each row may correspond to either a request, response, or feedback object.

In some embodiments, chunking may be used to divide a multiline JSON array or other batched input file into separate entries. For example, a chunking process may append each line as a new row in a chunk DMO (CDMO). The CDMO can then be use for further processing.

In some embodiments, chunking may not be performed. Instead, a JSON transformation may be applied on the originally ingested DMO. The transformation may be further chained into the flatten JSON transform used to determine the data objects.

The DMO may be flattened and transformed at 226 for ingestion into the data service instance 124. Flattening and transforming the data may involve converting it into one or more auditing and feedback data objects. For instance, auditing and feedback data may be stored as various different data objects corresponding to elements such as text generation requests, text generation responses, explicit feedback, implicit feedback, and/or other logical divisions. Additional details regarding the ingestion of the batched auditing and feedback data 202 are discussed with respect to the method 500 shown in FIG. 5.

In some embodiments, different elements of auditing and feedback data may be ingested separately and then mapped to separate DLOs. For instance, requests, responses, and feedback may be batched and/or ingested separately. Alternatively, such elements may be batched and/or ingested together.

In some embodiments, high-level elements of auditing and feedback data may be used to construct granular objects via the flattening transform. For example, request data may be flattened into three constituent DLOs corresponding to a Gateway Request, Content Quality, and Content Category. As another example, content generated by a generative language model may be separately classified based on safety categories such as toxicity, hate, identity, violence, physical, sexual, profanity, and bias. The specific objects and fields into which the data is flattened may depend on the data architecture of the computing services environment.

System Methodology

Figure 3:
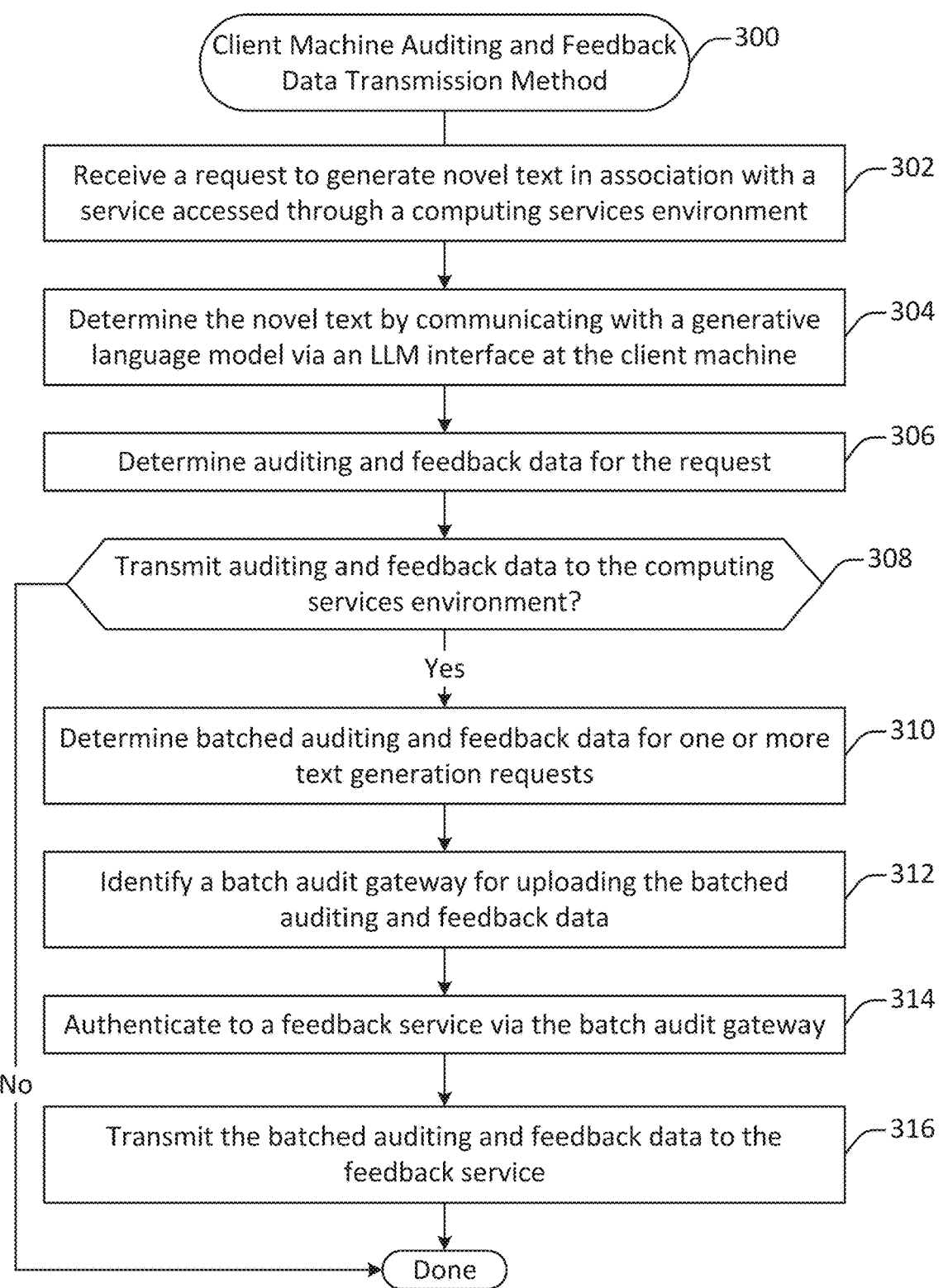
FIG. 3 illustrates a client machine auditing and feedback data transmission method, performed in accordance with one or more embodiments.

FIG. 3 illustrates a client machine auditing and feedback data transmission method 300, performed in accordance with one or more embodiments. The method 300 may be performed at a client machine in communication with a computing services environment. For instance, the client machine may be a computing device accessing computing services via an application instance at the computing services environment.

A request to generate novel text in association with a service accessed through a computing services environment is received at 302. According to various embodiments, any of a variety of services may be accessed via the generative language model, such as one or more web applications related to customer relations management, sales relations management, service relations management, or the like. Such services may be backed by an on-demand database accessible via the computing services environment.

In some embodiments, the service may be accessed through a web browser at the client machine. Alternatively, the service may be accessed through a native application at the client machine. For instance, the service may be accessed through a native application provided by the computing services environment for accessing services via the computing services environment. As discussed herein, the service may be accessed via an application instance located within an application instance region group that provides a logical division of computing resources associated with the computing services environment.

The novel text is determined at 304 by communication with a generative language model via an LLM interface at the client machine. According to various embodiments, as discussed herein, generative language models may be accessed either through the computing services environment or through an LLM interface at the client machine. When accessed via the client machine, such an LLM may be hosted either locally at the client machine or outside the client machine, for instance accessible via a network interface.

Auditing and feedback data is determined for the request at 306. According to various embodiments, various types of information may be included in the auditing and feedback data. For example, the auditing and feedback data may include input to the generative language model, such as a prompt used to generate the text, one or more model configuration parameters such as temperature, and the identity of the generative language model used to generate the text. As another example, the auditing and feedback data may include output generated by the generative language model, such as the prompt completion that includes the novel text. As yet another example, the auditing and feedback data may include implicit feedback data generated at the client machine, such as data characterizing how the novel text generated by the generative language model was used within the application.

A determination is made at 308 as to whether to transmit auditing and feedback data to the computing services environment. According to various embodiments, such data may be transmitted at any of various times, depending on one or more configuration parameters. For example, such data may be transmitted upon determining that a sufficient quantity of such data has been generated. For instance, the sufficient quantity may be a designated number of LLM requests. As another example, such data may be transmitted periodically, such as once every five minutes or once per hour. As yet another example, such data may be transmitted upon detection of a triggering condition, such as initializing or terminating an instance of an application.

Upon determining to transmit the auditing and feedback data to the computing services environment, batched auditing and feedback data for one or more text generation requests is determined at 310. In some embodiments, determining the batched auditing and feedback data may involve formatting the auditing and feedback data from one or more text generation requests in a manner consistent with an interface exposed by the computing services environment. For instance, the computing services environment may accept data in the format of a JavaScript Object Notation (JSON) file having a designated format.

A batch audit gateway for uploading the batched auditing and feedback data is identified at 312. In some embodiments, the batch audit gateway may be disposed within the same application instance region group as the application instance with which the client machine is interacting to access the computing services. The identity of the batch audit gateway may include a network address, which may be provided to the client machine by the computing services environment in the course of providing the services.

The client machine authenticates to a feedback service via the batch audit gateway at 314. Authenticating to the feedback service may involve operations such as transmitting authentication information from the client machine to the batch audit gateway and receiving an authentication token from the batch audit gateway once authentication has succeeded. The batched auditing and feedback data is transmitted to the feedback service at 114 via the batch audit gateway.

FIG. 4 illustrates a computing services environment auditing and feedback data storage method 400, performed in accordance with one or more embodiments. The method 400 may be performed at various elements of a computing services environment, such as at the batch audit gateway 114, the feedback service 112, the metadata service 120, and/or one or more other computing services environment elements.

A request is received from a client machine at 402 to store batched auditing and feedback data. In some embodiments, the request may be generated as discussed with respect to the method 400 shown in FIG. 4.

The client machine is authenticated to an application instance at 404. In some embodiments, authenticating the client machine to the application instance may involve verifying that the client machine has already been authenticated to the application instance. Alternatively, or additionally, a separate communication session between the client machine and the batch audit gateway and/or feedback service may be established.

One or more staging buckets in which to store the batched auditing and feedback data are identified at 406. According to various embodiments, information identifying the one or more staging buckets may be retrieved from the metadata service 120. As discussed herein, the metadata service may store information such as a location or locations in which to store feedback data for an application instance and/or for a tenant associated with an application instance.

The batched auditing and feedback data is stored to the identified one or more staging buckets at 408. In some embodiments, storing the batched auditing and feedback data may involve communicating via a storage interface that acts as a control layer for a storage repository such as an S3 bucket.

FIG. 5 illustrates a batched auditing and feedback data ingestion method 500, performed in accordance with one or more embodiments. The method 500 may be performed at one or more components of a computing services environment, such as in the application instance region group 122 shown in FIG. 1 and FIG. 2. The method 500 may be performed to process batched auditing and feedback data and ingest the processed data into a data service instance. Once ingested, the data may be used for auditing, analysis, tuning, and/or other operations related to the generative AI services.

A request to ingest batched auditing and feedback data into a data service instance is received at 502. In some embodiments, the request may be generated periodically. For instance, batched auditing and feedback data may be ingested into a data service instance at regular intervals, such as once per day, minute, or hour. Alternatively, the request may be generated upon detection of a triggering condition. For instance, data may be ingested upon determining that a sufficient quantity of batched auditing and feedback data has been stored for ingestion.

The batched auditing and feedback data is converted into a data lack object at 504. In some embodiments, a data lake object (DLO) may serve as a container for data ingested into the data service instance.

A structured data model object (DMO) is created at 504 based on the DLO. The DMO may convert the batched auditing and feedback data from the format in which it was received into a format suitable for ingestion. For example, the batched auditing and feedback data may be received in a file that includes a JSON list in which each line corresponds to a different auditing and feedback data entry. An entry may correspond, for instance, to a single interaction between a client machine and an LLM and may include separate portions for elements such as LLM input, LLM output, LLM parameters, implicit feedback, explicit feedback, and/or other information. As another example, the batched auditing and feedback data may be converted into a data object that represents the data in a format standard to various types of data objects within the computing services environment.

An auditing and feedback data entry is selected for ingestion at 508. In some embodiments, selecting the auditing and feedback data entry may involve separating the DMO into chunks. A chunk may correspond, for instance, to a single auditing and feedback data entry. Such data entries may be selected in any suitable order, in sequence or in parallel.

One or more data objects are determined at 510 from the auditing and feedback data entry. In some embodiments, different data objects may correspond to different database tables associated with auditing and feedback data stored in the data service instance. For instance, data objects may correspond to a request, to a response, or to feedback elements. The one or more data objects are stored at 512 in a database associated with the data service instance.

A determination is made at 514 as to whether to select an additional auditing and feedback data entry for ingestion. In some embodiments, additional auditing and feedback data entries may continue to be selected until all such entries have been ingested.

In some embodiments, one or more of the operations shown in FIG. 3, FIG. 4, and FIG. 5 may be performed in an order different than that shown. For instance, one or more operations may be performed in parallel.

Figure 6:
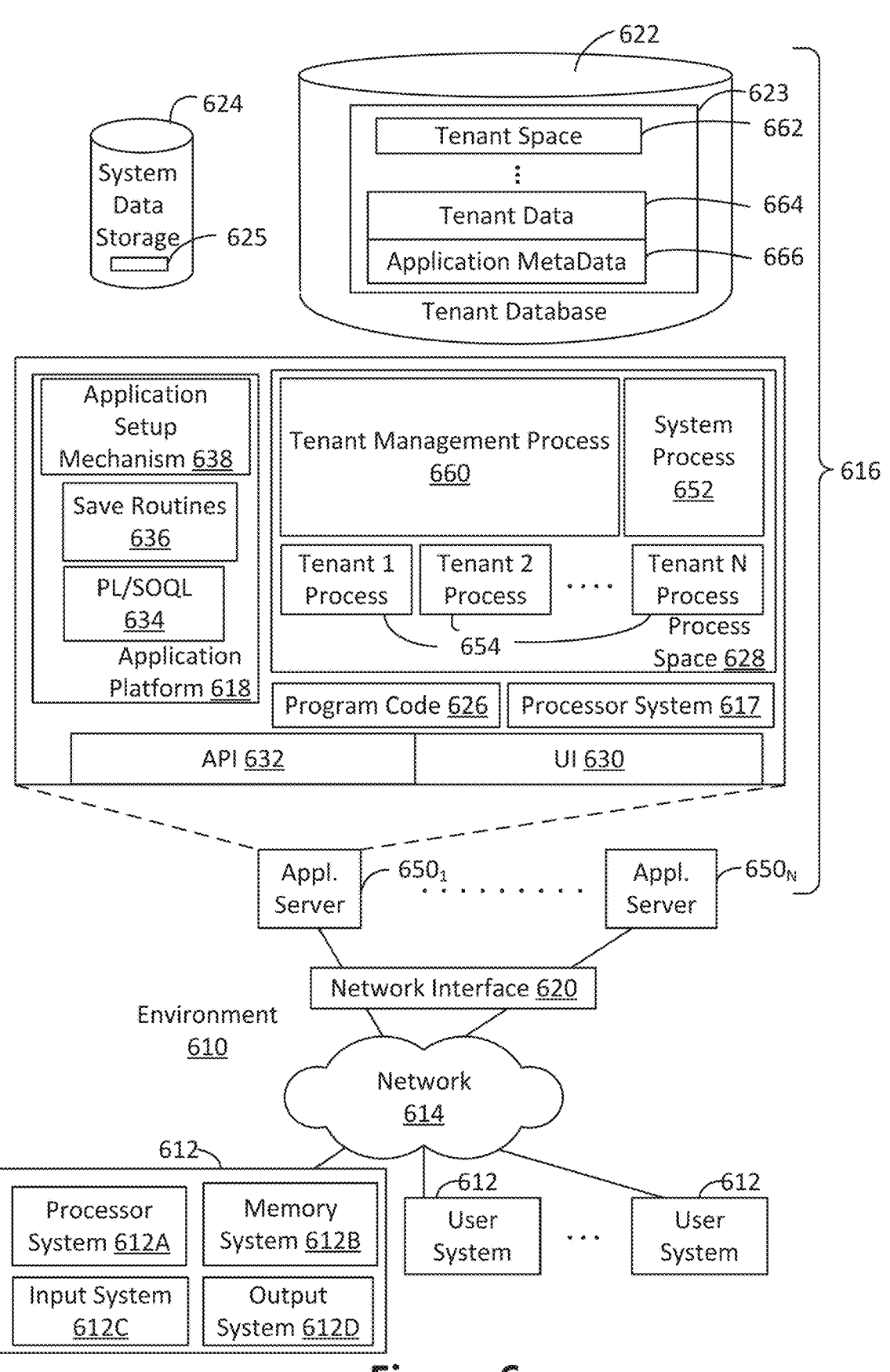
FIG. 6 shows a block diagram of an example of an environment that includes an on-demand database service configured in accordance with some implementations.

FIG. 6 shows a block diagram of an example of an environment 610 that includes an on-demand database service configured in accordance with some implementations. Environment 610 may include user systems 612, network 614, database system 616, processor system 617, application platform 618, network interface 620, tenant data storage 622, tenant data 623, system data storage 624, system data 625, program code 626, process space 628, User Interface (UI) 630, Application Program Interface (API) 632, PL/SOQL 634, save routines 636, application setup mechanism 638, application servers 650-1 through 650-N, system process space 652, tenant process spaces 654, tenant management process space 660, tenant storage space 662, user storage 664, and application metadata 666. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 618 may be a framework that allows the creation, management, and execution of applications in system 616. Such applications may be developed by the database service provider or by users or third-party application developers accessing the service. Application platform 618 includes an application setup mechanism 638 that supports application developers' creation and management of applications, which may be saved as metadata into tenant data storage 622 by save routines 636 for execution by subscribers as one or more tenant process spaces 654 managed by tenant management process 660 for example. Invocations to such applications may be coded using PL/SOQL 634 that provides a programming language style interface extension to API 632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 666 for a subscriber making such an invocation. Such system processes may also manage execution of application metadata 666 as an application in a virtual machine.

In some implementations, each application server 650 may handle requests for any user associated with any organization. A load balancing function (e.g., an F5 Big-IP load balancer) may distribute requests to the application servers 650 based on an algorithm such as least-connections, round robin, observed response time, etc. Each application server 650 may be configured to communicate with tenant data storage 622 and the tenant data 623 therein, and system data storage 624 and the system data 625 therein to serve requests of user systems 612. The tenant data 623 may be divided into individual tenant storage spaces 662, which can be either a physical arrangement and/or a logical arrangement of data. Within each tenant storage space 662, user storage 664 and application metadata 666 may be similarly allocated for each user. For example, a copy of a user's most recently used (MRU) items might be stored to user storage 664. Similarly, a copy of MRU items for an entire tenant organization may be stored to tenant storage space 662. A UI 630 provides a user interface and an API 632 provides an application programming interface to system 616 resident processes to users and/or developers at user systems 612.

System 616 may implement a web-based generative AI auditing and feedback data processing system. For example, in some implementations, system 616 may include application servers configured to implement and execute software applications involving collecting auditing and feedback data from client machines. The application servers may be configured to provide related data, code, forms, web pages and other information to and from user systems 612. Additionally, the application servers may be configured to store information to, and retrieve information from a database system. Such information may include related data, objects, and/or Webpage content. With a multi-tenant system, data for multiple tenants may be stored in the same physical database object in tenant data storage 622, however, tenant data may be arranged in the storage medium(s) of tenant data storage 622 so that data of one tenant is kept logically separate from that of other tenants. In such a scheme, one tenant may not access another tenant's data, unless such data is expressly shared.

Several elements in the system shown in FIG. 6 include conventional, well-known elements that are explained only briefly here. For example, user system 612 may include processor system 612A, memory system 612B, input system 612C, and output system 612D. A user system 612 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 612 to access, process and view information, pages and applications available from system 616 over network 614. Network 614 may be any network or combination of networks of devices that communicate with one another, such as any one or any combination of a LAN (local area network), WAN (wide area network), wireless network, or other appropriate configuration.

The users of user systems 612 may differ in their respective capacities, and the capacity of a particular user system 612 to access information may be determined at least in part by "permissions" of the particular user system 612. As discussed herein, permissions generally govern access to computing resources such as data objects, components, and other entities of a computing system, such as an auditing and feedback data processing system, a social networking system, and/or a CRM database system. "Permission sets" generally refer to groups of permissions that may be assigned to users of such a computing environment. For instance, the assignments of users and permission sets may be stored in one or more databases of System 616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 616 may provide on-demand database service to user systems 612 using an MTS arrangement. By way of example, one tenant organization may be a company that employs a sales force where each salesperson uses system 616 to manage their sales process. Thus, a user in such an organization may maintain contact data, leads data, customer follow-up data, performance data, goals and progress data, etc., all applicable to that user's personal sales process (e.g., in tenant data storage 622). In this arrangement, a user may manage his or her sales efforts and cycles from a variety of devices, since relevant data and applications to interact with (e.g., access, view, modify, report, transmit, calculate, etc.) such data may be maintained and accessed by any user system 612 having network access.

When implemented in an MTS arrangement, system 616 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 616 may also maintain system-level data usable by multiple tenants or other data. Such system-level data may include industry reports, news, postings, and the like that are sharable between tenant organizations.

In some implementations, user systems 612 may be client systems communicating with application servers 650 to request and update system-level and tenant-level data from system 616. By way of example, user systems 612 may send one or more queries requesting data of a database maintained in tenant data storage 622 and/or system data storage 624. An application server 650 of system 616 may automatically generate one or more SQL statements (e.g., one or more SQL queries) that are designed to access the requested data. System data storage 624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figures 7A, 7B:
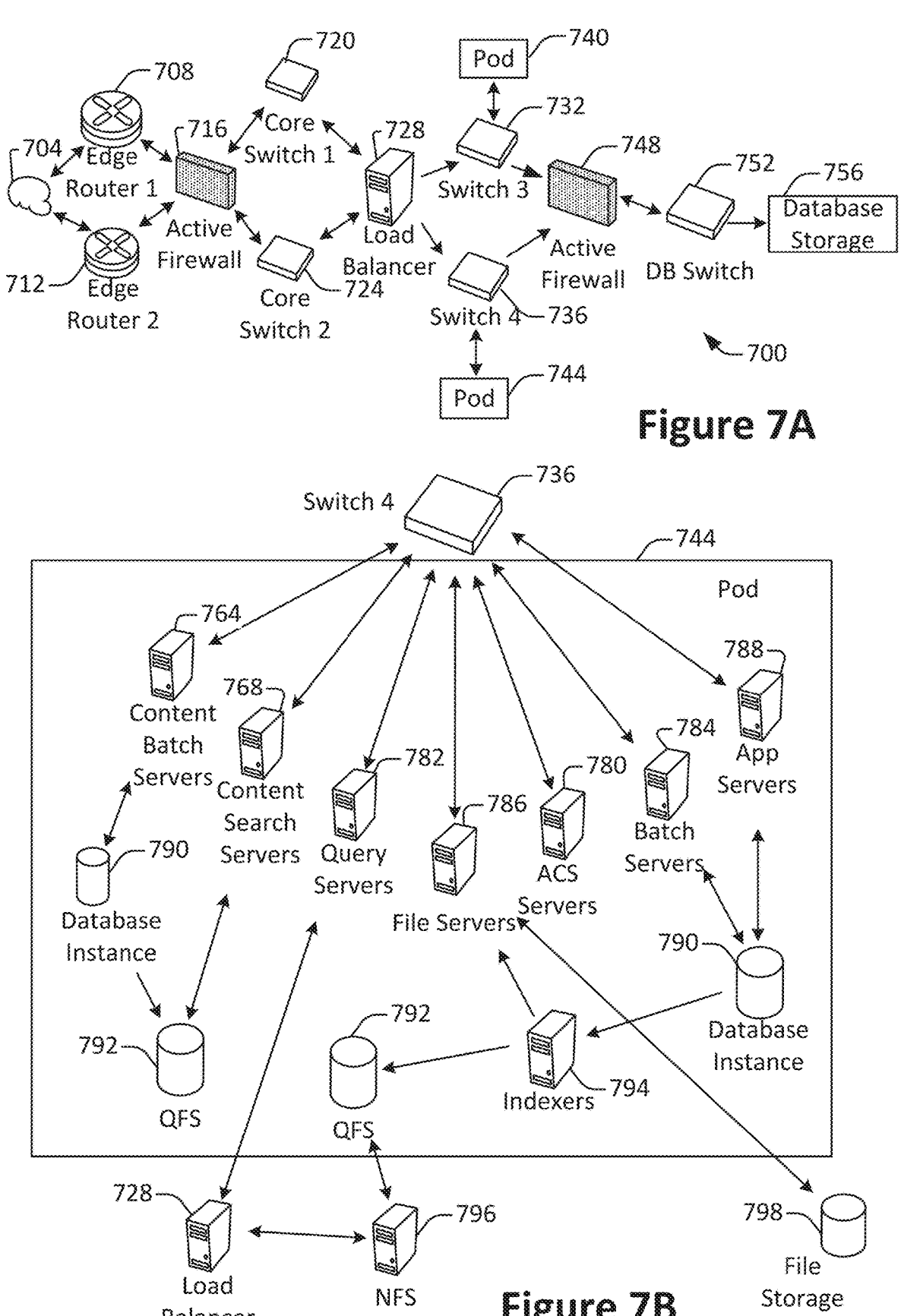
FIG. 7A and FIG. 7B together show system diagrams of an example of architectural components of an on-demand database service environment, configured in accordance with some implementations.

FIG. 7A shows a system diagram of an example of architectural components of an on-demand database service environment 700, configured in accordance with some implementations. An on-demand database service environment 700 is also referred to herein as a computing services environment. A client machine located in the cloud 704 may communicate with the on-demand database service environment via one or more edge routers 708 and 712. A client machine may include any of the examples of user systems 612 described above. The edge routers 708 and 712 may communicate with one or more core switches 720 and 724 via firewall 716. The core switches may communicate with a load balancer 728, which may distribute server load over different pods, such as the pods 740 and 744 by communication via pod switches 732 and 736. The pods 740 and 744, which may each include one or more servers and/or other computing resources, may perform data processing and other operations used to provide on-demand services. Components of the environment may communicate with a database storage 756 via a database firewall 748 and a database switch 752.

Accessing an on-demand database service environment may involve communications transmitted among a variety of different components. The environment 700 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 7A and 7B.

The cloud 704 refers to any suitable data network or combination of data networks, which may include the Internet. Client machines located in the cloud 704 may communicate with the on-demand database service environment 700 to access services provided by the on-demand database service environment 700. By way of example, client machines may access the on-demand database service environment 700 to retrieve, store, edit, and/or process generative AI auditing and feedback information.

In some implementations, the edge routers 708 and 712 route packets between the cloud 704 and other components of the on-demand database service environment 700. The edge routers 708 and 712 may employ the Border Gateway Protocol (BGP). The edge routers 708 and 712 may maintain a table of IP networks or 'prefixes', which designate network reachability among autonomous systems on the internet.

In one or more implementations, the firewall 716 may protect the inner components of the environment 700 from internet traffic. The firewall 716 may block, permit, or deny access to the inner components of the on-demand database service environment 700 based upon a set of rules and/or other criteria. The firewall 716 may act as one or more of a packet filter, an application gateway, a stateful filter, a proxy server, or any other type of firewall.

In some implementations, the core switches 720 and 724 may be high-capacity switches that transfer packets within the environment 700. The core switches 720 and 724 may be configured as network bridges that quickly route data between different components within the on-demand database service environment. The use of two or more core switches 720 and 724 may provide redundancy and/or reduced latency.

In some implementations, communication between the pods 740 and 744 may be conducted via the pod switches 732 and 736. The pod switches 732 and 736 may facilitate communication between the pods 740 and 744 and client machines, for example via core switches 720 and 724. Also or alternatively, the pod switches 732 and 736 may facilitate communication between the pods 740 and 744 and the database storage 756. The load balancer 728 may distribute workload between the pods, which may assist in improving the use of resources, increasing throughput, reducing response times, and/or reducing overhead. The load balancer 728 may include multilayer switches to analyze and forward traffic.

In some implementations, access to the database storage 756 may be guarded by a database firewall 748, which may act as a computer application firewall operating at the database application layer of a protocol stack. The database firewall 748 may protect the database storage 756 from application attacks such as structure query language (SQL) injection, database rootkits, and unauthorized information disclosure. The database firewall 748 may include a host using one or more forms of reverse proxy services to proxy traffic before passing it to a gateway router and/or may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some implementations, the database storage 756 may be an on-demand database system shared by many different organizations. The on-demand database service may employ a single-tenant approach, a multi-tenant approach, a virtualized approach, or any other type of database approach. Communication with the database storage 756 may be conducted via the database switch 752. The database storage 756 may include various software components for handling database queries. Accordingly, the database switch 752 may direct database queries transmitted by other components of the environment (e.g., the pods 740 and 744) to the correct components within the database storage 756.

FIG. 7B shows a system diagram further illustrating an example of architectural components of an on-demand database service environment, in accordance with some implementations. The pod 744 may be used to render services to user(s) of the on-demand database service environment 700. The pod 744 may include one or more content batch servers 764, content search servers 768, query servers 782, file servers 786, access control system (ACS) servers 780, batch servers 784, and app servers 788. Also, the pod 744 may include database instances 790, quick file systems (QFS) 792, and indexers 794. Some or all communication between the servers in the pod 744 may be transmitted via the switch 736.

In some implementations, the app servers 788 may include a framework dedicated to the execution of procedures (e.g., programs, routines, scripts) for supporting the construction of applications provided by the on-demand database service environment 700 via the pod 744. One or more instances of the app server 788 may be configured to execute all or a portion of the operations of the services described herein.

In some implementations, as discussed above, the pod 744 may include one or more database instances 790. A database instance 790 may be configured as an MTS in which different organizations share access to the same database, using the techniques described above. Database information may be transmitted to the indexer 794, which may provide an index of information available in the database 790 to file servers 786. The QFS 792 or other suitable filesystem may serve as a rapid-access file system for storing and accessing information available within the pod 744. The QFS 792 may support volume management capabilities, allowing many disks to be grouped together into a file system. The QFS 792 may communicate with the database instances 790, content search servers 768 and/or indexers 794 to identify, retrieve, move, and/or update data stored in the network file systems (NFS) 796 and/or other storage systems.

In some implementations, one or more query servers 782 may communicate with the NFS 796 to retrieve and/or update information stored outside of the pod 744. The NFS 796 may allow servers located in the pod 744 to access information over a network in a manner similar to how local storage is accessed. Queries from the query servers 722 may be transmitted to the NFS 796 via the load balancer 728, which may distribute resource requests over various resources available in the on-demand database service environment 700. The NFS 796 may also communicate with the QFS 792 to update the information stored on the NFS 796 and/or to provide information to the QFS 792 for use by servers located within the pod 744.

In some implementations, the content batch servers 764 may handle requests internal to the pod 744. These requests may be long-running and/or not tied to a particular customer, such as requests related to log mining, cleanup work, and maintenance tasks. The content search servers 768 may provide query and indexer functions such as functions allowing users to search through content stored in the on-demand database service environment 700. The file servers 786 may manage requests for information stored in the file storage 798, which may store information such as documents, images, basic large objects (BLOBs), etc. The query servers 782 may be used to retrieve information from one or more file systems. For example, the query system 782 may receive requests for information from the app servers 788 and then transmit information queries to the NFS 796 located outside the pod 744. The ACS servers 780 may control access to data, hardware resources, or software resources called upon to render services provided by the pod 744. The batch servers 784 may process batch jobs, which are used to run tasks at specified times. Thus, the batch servers 784 may transmit instructions to other servers, such as the app servers 788, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 8:
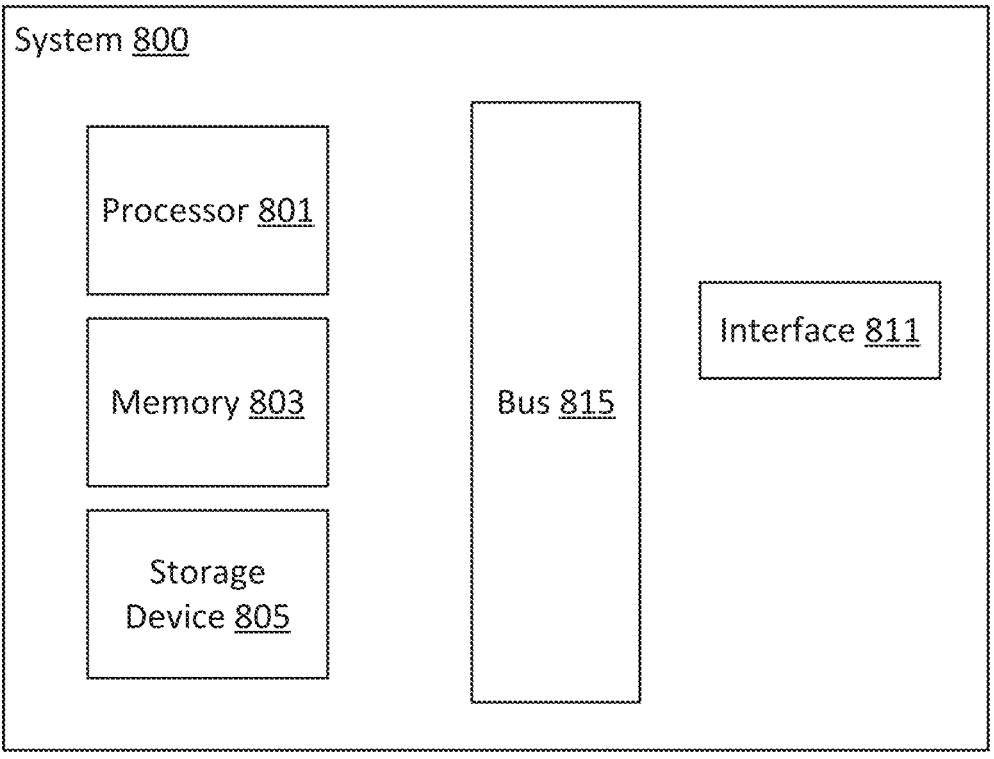
FIG. 8 illustrates one example of a computing device, configured in accordance with one or more embodiments.

FIG. 8 illustrates one example of a computing device. According to various embodiments, a system 800 suitable for implementing embodiments described herein includes a processor 801, a memory module 803, a storage device 805, an interface 811, and a bus 815 (e.g., a PCI bus or other interconnection fabric.) System 800 may operate as variety of devices such as an application server, a database server, or any other device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801.

In some embodiments, the interface 811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

In some embodiments, for instance in some configurations in which the system 800 acts as a client machine, the interface 811 may be configured as an LLM interface. For example, the interface 811 may be configured to provide access to one or more generative language models. Such a generative language model may be hosted within the system 800 or may be hosted outside of the system 800 and be accessed via a network.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

According to various implementations, the models and/or modules described herein may include classification, predictive, generative, conversational, or another form of artificial intelligence (AI) technology, such as AI model(s), agents, etc., implementing one or more forms of machine learning, a neural network, statistical modeling, deep learning, automation, natural language processing, or other similar technology. The AI technology may be included as part of a network or system comprising a hardware- or software-based framework for training, processing, fine-tuning, or performing any other implementation steps. Furthermore, the AI technology may include a hardware- or software-based framework that performs one or more functions, such as retrieving, generating, accessing, transmitting, etc. The AI technology may be implemented by a computer including a register coupled with a processor or a central processing unit (CPU).

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally or alternatively, the AI technology may be intermittently updated at a set interval or in real time based on resulting output or additional data to further train the AI technology. The AI technology may offer a variety of capabilities including text, audio, image, and other content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement Retrieval-Augmented Generation (RAG) or other techniques after training or fine-tuning by accessing a set of documents or knowledge base directed to a particular field or website other than the training or fine-tuning data to influence the AI technology's output with the set of documents or knowledge base.

To further guide and train output of the AI technology, a plurality of input prompts may be provided to the AI technology for the purpose of eliciting particular responses. In various implementations, the plurality of input prompts may correspond to the particular field or task to which the AI technology is trained. Additionally, the AI technology may be implemented along with a plurality of additional AI technologies. For example, a first AI model may produce a first output, which is used as input for a second AI model to produce a second output. These AI technologies may be used in succession of one another, in parallel with another, or a combination of both. Furthermore, the AI technologies may be merged in a variety of implementations, for example, by bagging, boosting, stacking, etc. the AI technologies.

According to various embodiments, techniques and mechanisms described herein address a variety of technical challenges, such as adapting generative language models to integrate with computing services environments. Computing services environment provide various types of computing services from a service provider to various client organizations. Examples of such services include, but are not limited to, those directed to customer relations management, sales relations management, supplier relations management, and database management applications. Autonomous agents may help to connect the power and flexibility of generative language models with the power and flexibility of computing services environments. However, existing approaches to autonomous agent configuration and implementation involve manually configuring autonomous agents to perform particular tasks. Such an approach suffers from various drawbacks, such as lack of testability, lack of extensibility, significant development delay, and more. In contrast, techniques and mechanisms described herein provide a set of architectures, frameworks, and methodologies facilitating autonomous agent development and implementation that in various embodiments are extensible, automatable, automated, flexible, and integrated with various computing services environment and generative language model platforms.

According to various embodiments, a computing services environment includes a wide variety of computing services arranged across a wide variety of computing devices in communication with one another. Likewise, a generative language model includes many neurons (e.g., millions, billions, or more) arranged in complex neural networks configured to perform sophisticated generative tasks. Coordinating between such systems involves a host of operations, including those related to processing, communication, architecture, coordination, monitoring, feedback, auditing, logging, and more. Any method performed by a system operating at the intersection of a computing services environment and a generative language model is, therefore, necessarily incapable of being performed in the human mind. In such a context, even a seemingly simple operation involves such a wide range of computing resources that a human mind would be incapable of performing the operation to within a method implemented as described herein. For example, although a human mind is capable of generating text, the human mind is incapable of executing a generative language model to generate text to complete a prompt specified in accordance with one or more embodiments.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of generative AI. However, the techniques disclosed herein apply to a wide variety of contexts, such as data generation via other forms of AI. Particular embodiments may be implemented without some or all of the specific details described herein.

In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computing services environment providing computing services to a plurality of entities, the computing services environment comprising:

a generative language model platform facilitating generation of novel text via a generative language model in association with the computing services;

a communication gateway communicating with a first plurality of client devices located outside of the computing services environment and within a first geographic region, the communication gateway receiving first generative language model logging input data from a first client device of the first plurality of client devices, the first generative language model logging input data characterizing designated novel text received at the first client device from the generative language model in accordance with the generative language model platform, the first generative language model logging input data being associated with an entity of the plurality of entities;

a feedback service configured to write the first generative language model logging input data to a storage location within the first geographic region, the first geographic region being identified by the feedback service by accessing a metadata entry via a metadata service, the metadata entry (i) identifying an entity of the plurality of entities and (ii) designating the first geographic region for receipt of generative language model auditing and feedback data associated with the entity; and a data service instance configured to store a plurality of database records determined based on generative language model logging input data retrieved from the storage location, the generative language model logging input data including the first generative language model logging input data and second generative language model logging input data received at a second communication gateway from a second client device, the second communication gateway communicating with a second plurality of client devices including the second client device located outside of the computing services environment in a second geographic region different from the first geographic region.

2. The computing services environment recited in claim 1, wherein the first generative language model logging input data includes a plurality of data entries corresponding to a plurality of different interactions between the first client device and the generative language model.

3. The computing services environment recited in claim 1, wherein storing the plurality of database records comprises determining one or more data lake objects based on the first generative language model logging input data and storing the one or more data lake objects within a data lake accessible within the computing services environment.

4. The computing services environment recited in claim 1, wherein storing the plurality of database records comprises determining one or more data model objects in accordance with a data model associated with the computing services environment.

5. The computing services environment recited in claim 1, wherein the storage location comprises a simple storage service bucket and a storage interface facilitating access to the simple storage service bucket.

6. The computing services environment recited in claim 1, wherein the computing services environment provides access to a plurality of application instances associated with the plurality of entities.

7. The computing services environment recited in claim 6, wherein the feedback service is associated with an application instance of the plurality of application instances, the application instance being associated with the entity of the plurality of entities.

8. The computing services environment recited in claim 6, wherein the feedback service is associated with an application instance of the plurality of application instances, the application instance being associated with a service provider of the computing services environment.

9. A method implemented at a computing services environment providing computing services to a plurality of entities, the method comprising:

communicating, via a communication gateway, with a first plurality of client devices located outside of the computing services environment and within a first geographic region, the communication gateway receiving first generative language model logging input data from a first client device of the first plurality of client devices, the first generative language model logging input data characterizing designated novel text received at the first client device from the generative language model in accordance with a generative language model platform facilitating generation of novel text via a generative language model in association with the computing services, the first generative language model logging input data being associated with an entity of the plurality of entities;

writing the first generative language model logging input data to a storage location within the first geographic region via a feedback service, the first geographic region being identified by the feedback service by accessing a metadata entry via a metadata service, the metadata entry (i) identifying an entity of the plurality of entities and (ii) designating the first geographic region for receipt of generative language model auditing and feedback data associated with the entity; and storing a plurality of database records determined based on generative language model logging input data retrieved from the storage location via a data service instance, the generative language model logging input data including the first generative language model logging input data and second generative language model logging input data received at a second communication gateway from a second client device, the second communication gateway communicating with a second plurality of client devices including the second client device located outside of the computing services environment in a second geographic region different from the first geographic region.

10. The method recited in claim 9, wherein the first generative language model logging input data includes a plurality of data entries corresponding to a plurality of different interactions between the first client device and the generative language model.

11. The method recited in claim 9, wherein storing the plurality of database records comprises determining one or more data lake objects based on the first generative language model logging input data and storing the one or more data lake objects within a data lake accessible within the computing services environment.

12. The method recited in claim 9, wherein storing the plurality of database records comprises determining one or more data model objects in accordance with a data model associated with the computing services environment.

13. The method recited in claim 9, wherein the computing services environment provides access to a plurality of application instances associated with the plurality of entities.

14. The method recited in claim 13, wherein the feedback service is associated with an application instance of the plurality of application instances, the application instance being associated with the entity of the plurality of entities.

15. The computing services environment recited in claim 13, wherein the feedback service is associated with an application instance of the plurality of application instances, the application instance being associated with a service provider of the computing services environment.

16. One or more non-transitory computer readable media having instructions stored thereon for performing a method implemented at a computing services environment providing computing services to a plurality of entities, the method comprising:

communicating, via a communication gateway, with a first plurality of client devices located outside of the computing services environment and within a first geographic region, the communication gateway receiving first generative language model logging input data from a first client device of the first plurality of client devices, the first generative language model logging input data characterizing designated novel text received at the first client device from the generative language model in accordance with a generative language model platform facilitating generation of novel text via a generative language model in association with the computing services, the first generative language model logging input data being associated with an entity of the plurality of entities;

writing the first generative language model logging input data to a storage location within the first geographic region via a feedback service, the first geographic region being identified by the feedback service by accessing a metadata entry via a metadata service, the metadata entry (i) identifying an entity of the plurality of entities and (ii) designating the first geographic region for receipt of generative language model auditing and feedback data associated with the entity; and storing a plurality of database records determined based on generative language model logging input data retrieved from the storage location via a data service instance, the generative language model logging input data including the first generative language model logging input data and second generative language model logging input data received at a second communication gateway from a second client device, the second communication gateway communicating with a second plurality of client devices including the second client device located outside of the computing services environment in a second geographic region different from the first geographic region.

17. The one or more non-transitory computer readable media recited in claim 16, wherein storing the plurality of database records comprises determining one or more data model objects in accordance with a data model associated with the computing services environment.

* * * * *